United States Patent [19]
DeMarco

[11] Patent Number: 4,977,623
[45] Date of Patent: Dec. 18, 1990

[54] USER WEARABLE INFLATABLE GARMENT
[76] Inventor: Vincent J. DeMarco, 3802 Canon St., San Diego, Calif. 92020
[21] Appl. No.: 345,287
[22] Filed: May 1, 1989
[51] Int. Cl.⁵ .............................................. A41D 13/00
[52] U.S. Cl. .................................................. 2/69; 2/2; 2/DIG. 3
[58] Field of Search ............................ 2/69, 2, DIG. 3
[56] References Cited
U.S. PATENT DOCUMENTS

| | | | |
|---|---|---|---|
| 3,895,396 | 7/1975 | Amarantos | 2/2 |
| 3,921,944 | 11/1975 | Morrison | 2/2 |
| 3,995,320 | 12/1976 | Zafuto | 2/2 |
| 4,089,065 | 5/1978 | McGee | 2/2 |
| 4,637,074 | 1/1987 | Taheri | 2/2 |
| 4,825,469 | 5/1989 | Kincheloe | 2/2 |

FOREIGN PATENT DOCUMENTS

| | | | |
|---|---|---|---|
| 8201464 | 5/1982 | Fed. Rep. of Germany | 2/DIG. 3 |
| 8102491 | 2/1981 | France | 2/DIG. 3 |
| 2099687 | 12/1982 | United Kingdom | 2/DIG. 3 |

Primary Examiner—Werner H. Schroeder
Assistant Examiner—G. Nale
Attorney, Agent, or Firm—Frank D. Gilliam

[57] ABSTRACT

A garment such as a vest or jump suit containing one or more inflatable gas-bags which will automatically expand upon appropriate signals from remote and garment contained deceleration sensors. A unique coded signal system is employed to insure that in fact inflation is required of the gas-bag or gas-bags prior to inflation to prevent accidental inflation.

13 Claims, 3 Drawing Sheets

USER WEARABLE INFLATABLE GARMENT

BACKGROUND OF THE INVENTION

The invention is directed to inflatable bags employed for individual safety, and particulary to inflatable garments which can be individually worn by vehicle occupants or otherwise worn in conditions which warrant such personal protection.

Inflatable buoyant garments are well known in the boating art. An example of such a jacket can be found in U.S. Pat. No. 3,266,070 issued to inventor M. H. O'Link on Aug. 16, 1966. Other similar flotation vests have used for years. These floatation vests are generally inflated by two convenient methods, namely by the person wearing the vest to inflate the bags by means of blowing air from the mouth into the vest and by the use of pressured cylinders of $CO_2$ or the like. However, in all instances the vests are inflated on demand by the user as required. None of the prior art vests are inflated automatically or by means of deceleration sensing.

Buoyant vests are taught by the following U.S. Pat. Nos. 3,266,070; 3,948,541; 4,380,441 and Re. 32,023.

The air bag, also sometimes known as the Safety Air Cushion (SAC), is a device invented and designed in the United States as an alternative for a seat belt for protection of passengers in a vehicle road accident.

The air bag is a strong inflatable neoprene coated woven Nylon bag. When not in use it if deflated, rolled and stored beneath the vehicle's instrument panel. An air distribution system is linked to a cylinder of compressed air with a sensing device to determine when the car is involved in an accident.

The sensing device is a single accelerometer which is pre-set to open a valve and release the compressed air when a violent deceleration takes place.

Examples of air bags and air bag inflation can be found in U.S. Pat. Nos. 3,430,979; 4,178,016 and 4,243,248.

There are no prior patents that combine a air bag system in a garment to be worn by a person riding as a passenger in a vehicle or encountering possible danger that would require the use of such a device. The air bag inflation systems which are now available use only deceleration devices that are attached to the vehicle. There are no sensing devices worn by the passengers of the vehicle.

The present invention fills a large and critical gap in the vehicle safety art by providing a garment that can be worn by a passenger in a vehicle and a combined vehicle and passenger sensing system for inflating the garment in the event that the vehicle and the passenger encounter sufficient deceleration.

An invention of this type should find wide acceptance in the vehicle passenger safety art.

SUMMARY OF THE INVENTION

The invention comprises a garment worn by a passenger in a vehicle or in areas where collision with objects traveling at great speeds. The garments can take the form of a vest, jump suit or the like. The garment contains one or more inflatable air bags positioned to surround or nearly surround the wearer when inflated and to take little room to impede the normal functions of the wearer when deflated. Deceleration sensing is performed by a plurality of crash sensor detectors some of which are attached to the structure of the vehicle and some of which are attached to the garment worn by the passenger of that vehicle. The crash sensor detectors are unique in that they contain a standard typical accelerometer driving a piezoelectric crystal which produces a voltage to operate a monolithic frequency modulated pulse coded transmitter. This feature allows the crash sensors to be self powered if no external source of power is desirable or available. If additional power is required to operate the inflation device than external available power from batteries or the like can be utilized. The monolithic transmitter either transmits to a monolithic receiver/amplifier, as the case with the sensors attached to the structure of the vehicle, or wired to the monolithic receiver/amplifier. The logic circuit will not trigger the inflation of the bag or bags unless at least four initial trigger input signals are received by the logic circuit from crash sensors two of which must come from crash sensors attached to the vehicle or at least external to the garment and at least two must come from garment positioned crash sensors.

When a selected level of deceleration is felt by the crash sensors, the output signals are received by the logic circuit which are coded matched filter monolithic receivers/receiver amplifiers. The logic circuit comprises either an AND or OR gate logic gate. Upon receipt of the at least four initial input trigger voltage signals to the AND or OR logic gate from the plurality of crash sensors the level of the received voltage signals are amplified by the voltage amplifier and provide a sufficient voltage signal for air bag deployment. The deployment can be from pressurized cylinders of gas carried in the vest which are punctured by actuation of a relay actuated plunger or the like, an external source of pressurized gas carried by the vehicle, by activation of a valve to an open condition, an electric detonator which sets off a powder charge contained in the garment or any other known means for inflating the air bag or bags by use of the electric signal from the amplifier.

Known methods of inflating air bags by pyrotechnic devices are taught by U.S. Pat. No. 4,178,016 and 4,243,248. Air bag deployment by pressurized gas is taught by U.S. Pat. No. 3,430,979. Similar or other means may be employed to operate the present invention.

An object of this invention is to provide a garment worn by a passenger in a vehicle or otherwise in position of danger which if impact occurs is inflatable by a selected level of deceleration.

Another object of this invention is to provide a deployment system that will only inflate an air bag, air bags or the like when impact is eminent.

Still another object of this invention is to provide power for signaling activation of the air bag deployment system in part by power generated by the deceleration or impact which signals for air bag deployment.

Still another object of this invention is to inflate the garment only when at least two crash sensors from a plurality of sensors at two separate locations send appropriate signals.

Yet another object of this invention is to provide a garment in the form of a vest or jump suit formed from suitable resilient material such as, Nylon, which contains one or more inflatable air bags that substantially surround and protect the wearer when the bag or bags are inflated by coded signals from sensors sensing a predetermined level of deceleration.

These and other features, and advantages of the present invention will become more apparent from the following description when taken in connection with the accompanying drawings which shows, for purpose of illustration only, an embodiments in accordance with the present invention, and wherein:

BRIEF DESCRIPTION OF THE DRAWING FIGURES

Details of the invention, and certain preferred embodiments thereof, will be further understood upon reference to the drawing Figures, wherein.

DETAILED DESCRIPTION OF THE PREFERRED EMBODIMENT

Figure 1:
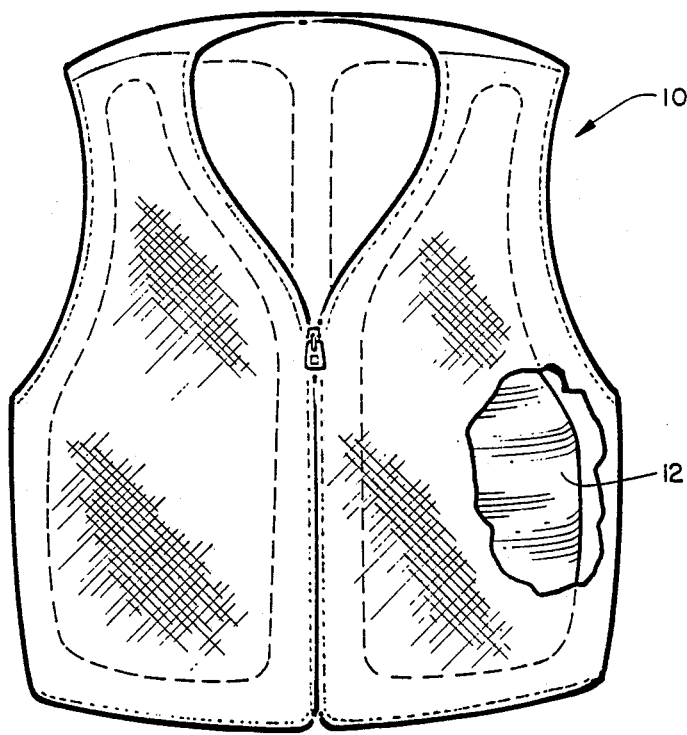
FIG. 1 is a perspective showing of a vest type garment with the air bag/air bags deflated ready to be worn.
Figure 2:
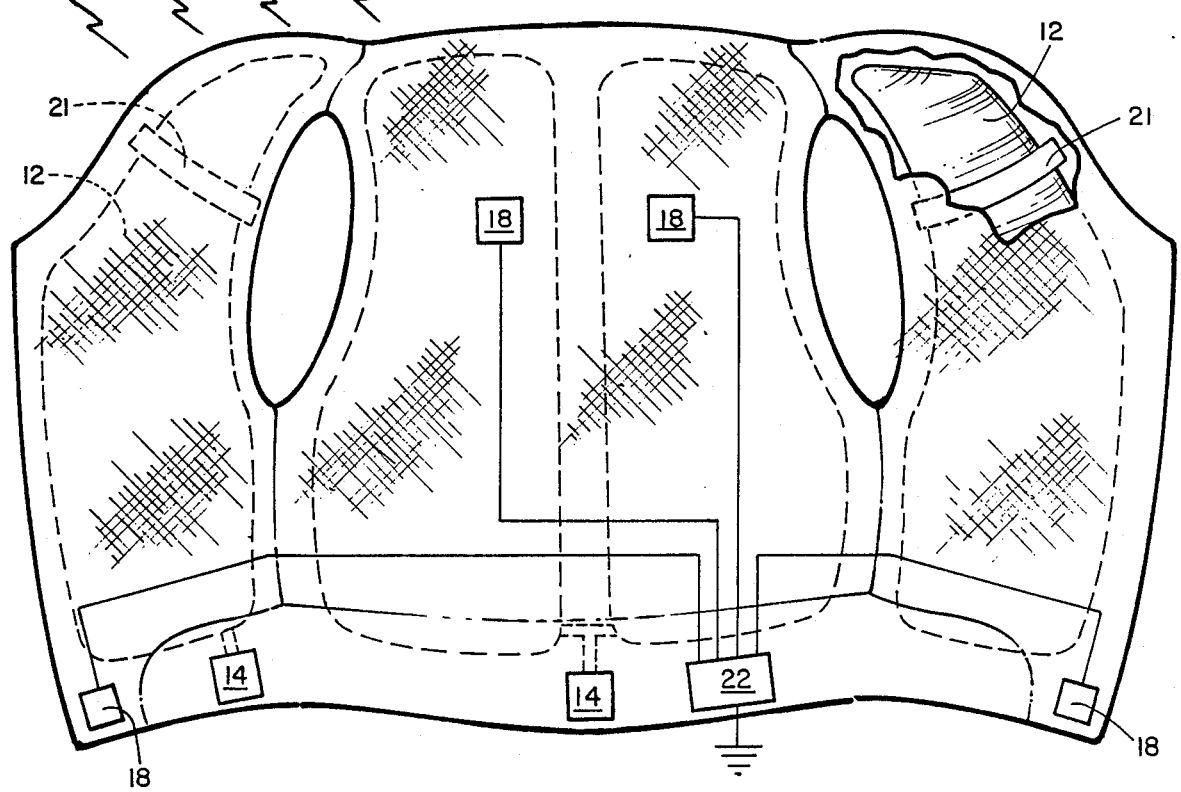
FIG. 2 is as showing of the vest of FIG. 1 open for disclosing air bag/air bags inflation apparatus.
Figure 3:
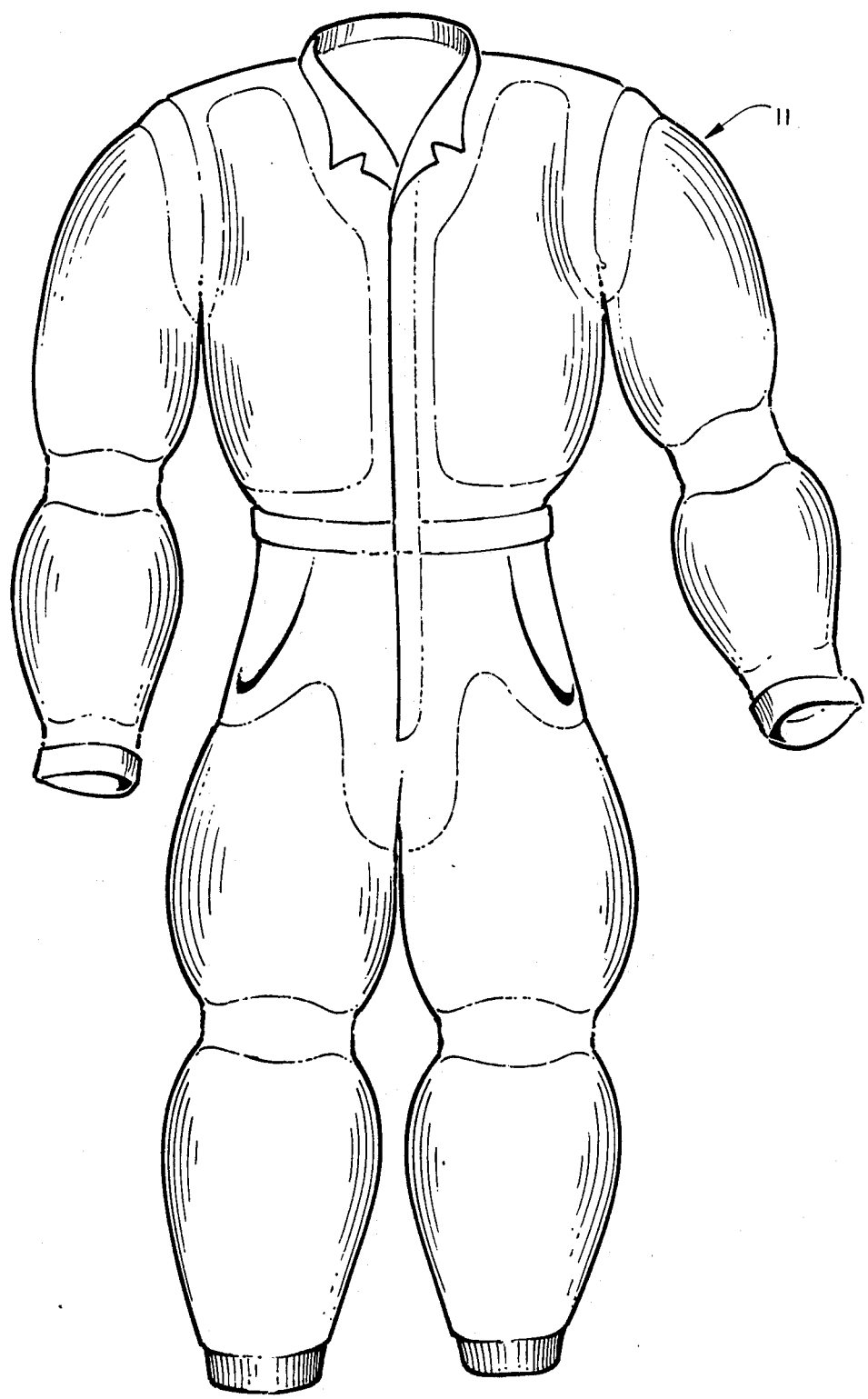
FIG. 3 is a perspective showing of a jump suit type garment with the air bag/air bags inflated for wearer protection.

Referring now specifically to FIGS. 1 through 3 which depict preferred examples of the type of garments employed to practice the invention. FIGS. 1 and 2 depict showings of a garment 10 of the vest type not unlike those worn by boaters for buoyancy when the wearer is in water or the like. The garment 10 includes a plurality of individual inflatable bags 12 positioned in locations which encompass the wearer when inflated as shown in FIG. 3. The inflation can be accomplished by self contained pressurized air or gas cylinders 14 the air or gas from which is released by the action of signals from a combination of crash sensors 16 and 18 herein after described.

When the gas is caused to be released from cylinders 14 the air bag or bags are inflated as shown in the jump suit garment of FIG. 3 and surround and substantially protect the wearer from impact injury.

It should be understood that the air bags may have interconnecting air or gas passageways 21 wherein the plurality of air bags are effectively only a single air bag surrounding the wearer.

Figure 4:
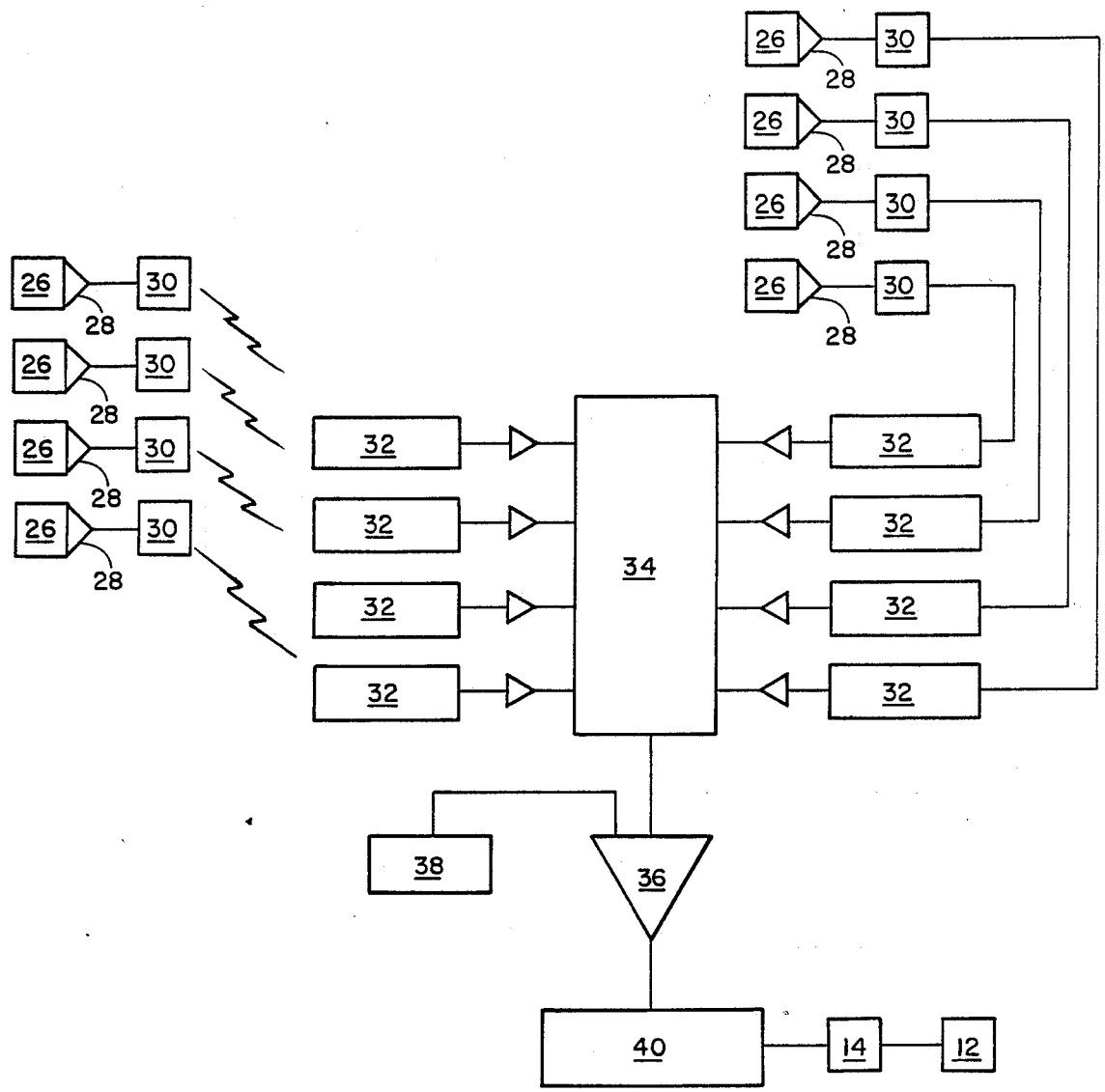
FIG. 4 is a block diagram showing the inflation deployment components of the present invention.

Referring now to FIG. 4 which is a block showing of the air bag or bags deploying mechanism 24. A plurality of accelerometer crash or deceleration sensors 16 are located remote from the garment 10 and the wearer. A plurality of sensors 18 of the same type as 16′, as shown in FIG. 2, are positioned in the garment or attached to the wearer of the garment. The crash sensors 16 and 18 comprise a strain gage accelerometer 26 and an associated voltage generating sensor 28. The voltage generating sensor may be fabricated from a piezoelectric polymer material capable of producing electrical energy in response to changes in mechanical forces. One example of this type material is Polyvinylidene (PVF-2) which when fabricated as a membrane and given a coating of Barium Titinate will produce electrical energy under conditions of acceleration. In general there is an entire class of materials referred to as Ferroelectric materials which are capable of generating a voltage (piezoelectric) when a mechanical force (acceleration) is imposed upon them. The crash sensors are mechanical strain gages coupled to a piezoelectric transducer. These devices will produce a voltage when a mechanical force is applied to them. Any vehicle, in motion, produces forces on its structure and also on any device associated with their operation, a so called performance envelope. Operation within these specified limits will produce a certain level of voltages from the sensors attached to the vehicle. Prior knowledge of a performance envelope and the associated sensor voltages is required to determine and set the "threshold" levels within the sensors. This information can be obtained from actual testing of the vehicle or class of vehicles under consideration. The sensors 16 and 18 are designed to ignore normal expected forces and take only impulse forces into consideration. If the vehicle is subjected to an impulse force which is predetermined by testing to define a "crash" then the sensors will react to trigger the expansion of the air bag or bags. In summary, the pre-calibrated threshold circuity will ignore normal acceleration/deceleration forces encountered in non emergency situations.

The output trigger signal from the crash sensors is fed into a monolithic R.F. amplifier 30 which produces a different coded signal for each specific sensor 16 and 18 location. The R.F. output signals from the crash sensors will be received and detected/converted by a matched filter and/or a monolithic gate receiver 32.

The receiver also determines specific location of the output signals from the garment or wearer of the garment. In order to trigger bag or bags inflation a minimum of four input signals are simultaneously required, two signals from the external sensors 16 and two sensors 18 from the garment or wearer associated sensors are required at the input of a logic AND/Or Gate circuit 34. The matched filters 32 at the output of the sensors either receiving RF from remote positioned sensors 16 or direct wired signals from the wearer associated sensors 18 are matched to receive only a specific sensor coded output. These filters 32 are integrators which integrate the received signal from all of the sensors if by RF or wire. When a sensor R.F. is received by a filter which when integrated produces a signal that matches the expected signal from a specific sensor that it is designed to recognize, the filter produces an output signal. This output signal is fed into the logic AND/OR gate 34. When two signals are received simultaneously from two separate sensors 16 attached to the vehicle structure and two sensors 18 on the garment or person an output signal from the Logic AND/OR GATE provides an output signal which is fed into a voltage amplifier 36 powered by batteries 38 or the like. The output signal from the voltage amplifier 36 causes the bag or bags inflation mechanism 40 to cause cylinder 14 to inflate the bag or bags 12.

The inflation mechanism 40 could also set off a pyrotechnic charge which produces gas under pressure to inflate the air bag in the same manner as the pressurized cylinder of gas. The air bag or bags inflate only when the vehicle and the wearer of the garment undergo an deceleration force greater than a predetermined threshold level force. The sensors mounted within the garment or worn by the wearer of the garment will be subjected to the same deceleration forces and this combination of out put signals (vehicle and passenger) will provide a non-false alarm signal to trigger the voltage amplifier 36 causing the air bag or bags to inflate.

The amplifier is generally located within the garment but if need be can be located at any other convenient location. The amplifier can be powered by a self contained power source 18 such as a battery, as afore mentioned, or can be powered via power cord (not shown) from an additional external source.

What is hereby taught is a vest or jump suit or the like garment containing one or more air bags which will inflate only upon receipt of appropriate coded signals from a combination of remote and garment associated sensors which are capable of measuring deceleration and converting that level of deceleration which is above a predetermined threshold level into a pulse coded modulated signal which is the initial trigger signal used to expand the air bag or bags. The garment will provide individual personnel protection to such individual as helicopter pilots, automobile race car drivers or any other individuals requiring a crash protection device.

Although the present invention has been described in conjunction with one preferred embodiment, it is to be understood modifications and variations may be resorted to without departing from the spirit and the scope of the invention, as those skilled in the art will readily understand.

What is claimed is:

1. A garment for personal crash impact protection comprising:
    said garment designed to enclose at least the upper torso of a person, said garment is non-restraining to the normal routine of the wearer;
    a plurality of first crash sensors located in a fixed position remote from the garment;
    a plurality of second crash sensors located in close relationship to the garment;
    each of said plurality of first and second crash sensors provide a separate coded output signal when a predetermined threshold level of deceleration is sensed;
    at least one inflatable air bag located in said garment which when inflated substantially encompass the torso of the wearer adjacent thereto; and
    inflation means connected to receive said output signals from said plurality of first and second crash sensors for inflating said at least one inflatable air bag when a preselected number of signals are simultaneously received from a selected number of said plurality of first and second crash sensors.

2. The invention as defined in claim 1 wherein said garment is a vest.

3. The invention as defined in claim 1 wherein said garment is a jump suit.

4. The invention as defined in claim 1 wherein said plurality of first and second crash sensors are accelerometers.

5. The invention as defined in claim 4 additionally comprising a ferroelectric member associated with said each of said accelerometers for generating a voltage when each of said plurality of deceleration crash sensors have an output signal.

6. A garment for personal crash impact protection comprising:
    said garment designed to enclose at least the upper torso of a person, said garment is non-restraining to the normal routine of the wearer;

7. The invention as defined in claim 1 wherein said at least one air bag inflates when signals from at least two first and two second plurality of crash sensors are simultaneously received.

8. The invention as defined in claim 1 additionally comprising a power source for powering said inflation means.

9. The invention as defined in claim 1 wherein said inflation means comprises a pressurized cylinder of gas which is released into said at least one air bag when said first and second crash sensors produce an output signal.

10. The invention as defined in claim 1 wherein said inflation means comprises pyrotechnic means which when activated produces gas under pressure when said first and second deceleration sensors produce an output signal.

11. The invention as defined in claim 1 wherein said first and second plurality of crash sensors number four and at least simultaneous outputs from two of each are required to cause said at least one air bag to inflate.

12. The invention as defined in claim 1 wherein at least said first crash sensors have an RF link with said inflation means.

13. A garment for personal crash impact protection comprising:
    said garment designed to enclose at least the upper torso of a person, said garment is non-restraining to the normal routine of the wearer;
    a plurality of first accelerometers located in a fixed position remote from the garment;
    a plurality of second accelerometers located in close relationship to the garment;
    said plurality of first and second accelerometers provide an output signal when a predetermined threshold level of deceleration is sensed;
    a ferroelectric member associated with each of said accelerometers for generating a voltage when each of said plurality of accelerometers have an output signal;
    at least one inflatable air bag located in said garment which when inflated substantially encompass the torso of the wearer adjacent thereto; and
    inflation means connected to receive said output signals from said plurality of first and second accelerometers for inflating said at least one inflatable air bag when a preselected number of signals are simultaneously received from a selected number of said plurality of first and second accelerometers.

* * * * *